(12) United States Patent
Nagorny et al.

(10) Patent No.: US 12,296,520 B2
(45) Date of Patent: May 13, 2025

(54) PART CONTROL DEVICE AND METHOD

(71) Applicant: Université de Chambéry—Université Savoie Mont Blanc, Chambery (FR)

(72) Inventors: Pierre Nagorny, Chambery (FR); Eric Pairel, Chambery (FR); Maurice Pillet, Chambery (FR)

(73) Assignee: Université de Chambéry—Université Savoie Mont Blanc, Chambery (FR)

( * ) Notice: Subject to any disclaimer, the term of this patent is extended or adjusted under 35 U.S.C. 154(b) by 377 days.

(21) Appl. No.: 17/762,476

(22) PCT Filed: Sep. 18, 2020

(86) PCT No.: PCT/EP2020/076075
§ 371 (c)(1),
(2) Date: Mar. 22, 2022

(87) PCT Pub. No.: WO2021/058386
PCT Pub. Date: Apr. 1, 2021

(65) Prior Publication Data
US 2022/0339835 A1 Oct. 27, 2022

(30) Foreign Application Priority Data

Sep. 27, 2019 (FR) ..................................... 19/10706

(51) Int. Cl.
*B29C 45/76* (2006.01)
*G01N 21/88* (2006.01)
(Continued)

(52) U.S. Cl.
CPC ......... *B29C 45/76* (2013.01); *G01N 21/8806* (2013.01); *B29C 2945/76167* (2013.01); *B29C 2945/76461* (2013.01); *B29K 2101/12* (2013.01); *G01J 2005/0077* (2013.01); *G01N 2021/8411* (2013.01); *G01N 2021/8848* (2013.01)

(58) Field of Classification Search
CPC ........ G01J 4/04; G01J 5/00; G01J 2005/0077; G01N 2021/8848
See application file for complete search history.

(56) References Cited

U.S. PATENT DOCUMENTS

2009/0030544 A1    1/2009  Floeder
2017/0132458 A1*   5/2017  Short ................... G06V 40/172
(Continued)

FOREIGN PATENT DOCUMENTS

CN      1072637 A  *  6/1993
KR   20170122649 A    11/2017
WO    2019025011 A1    2/2019

OTHER PUBLICATIONS

Espacenet translation of Ruess, KR20170122649A, originally published 2017 (Year: 2017).*
(Continued)

*Primary Examiner* — Maurice C Smith
(74) *Attorney, Agent, or Firm* — Noblitt & Newson, PLLC

(57) ABSTRACT

The present description concerns a device for controlling parts being manufactured, comprising at least one image sensor configured to form, for each part at last one first image by thermography and at least one second image by polarimetry.

12 Claims, 5 Drawing Sheets

(51) Int. Cl.
  *B29K 101/12*   (2006.01)
  *G01J 5/00*    (2022.01)
  *G01N 21/84*   (2006.01)

(56) References Cited

U.S. PATENT DOCUMENTS

2018/0005012 A1* 1/2018 Aycock .................... G01J 4/04
2020/0285838 A1* 9/2020 Hu ........................ G06V 10/76

OTHER PUBLICATIONS

H. D Geiler, "Photoelastic characterization of residual stress in GaAs-wafers", Feb. 20, 2006 (Year: 2006).*
Wikipedia, "Thermographie," https://fr.wikipedia.org/wiki/Thermographie, accessed Apr. 29, 2020.
Wikipedia, "Polarimetrie," https://fr.wikipedia.org/wiki/TPolarim%C3%A9trie, accessed Apr. 29, 2020.

* cited by examiner

PART CONTROL DEVICE AND METHOD

The present patent application claims the priority benefit of French patent application FR19/10706 which is herein incorporated by reference.

TECHNICAL BACKGROUND

The present disclosure generally concerns the manufacturing industry and, more particularly, quality control devices and methods.

PRIOR ART

In the world of industry, quality controls are frequently performed at the end of part production lines. These quality controls typically aim at making sure that the produced parts comply with geometric, dimensional, etc. requirements, specified by specifications. Otherwise, non-compliant parts are generally discarded.

SUMMARY

There is a need to improve existing quality control devices and methods.

An embodiment overcomes all or part of the disadvantages of known quality control devices and methods.

An embodiment provides a device for controlling parts being manufactured, comprising at least one image sensor configured to form, for each part: at last one first image by thermography; and at least one second image by polarimetry.

According to an embodiment, the device comprises exactly two image sensors, a first image sensor being configured to form the image by thermography and a second image sensor being configured to form the image by polarimetry.

According to an embodiment, the device comprises a single image sensor.

According to an embodiment, a score is assigned, to each part, according to the first and second images.

According to an embodiment, a calculation of the score is, during the part manufacturing, adapted by a learning process.

According to an embodiment, a presence detector is configured to detect the presence of a part.

According to an embodiment, the parts comprise one or a plurality of thermoplastic materials.

According to an embodiment, the parts are manufactured by injection into a mold.

According to an embodiment, the device comprises a lighting device configured to illuminate the part.

An embodiment provides a method of controlling parts being manufactured, implementing at least one device such as described.

An embodiment provides a system comprising: a part manufacturing line; and a device such as described.

According to an embodiment, the device is located at the outfeed of a plastic injection machine.

BRIEF DESCRIPTION OF THE DRAWINGS

The foregoing and other features and advantages of the present invention will be discussed in detail in the following non-limiting description of specific embodiments and implementation modes in connection with the accompanying drawings, in which.

DESCRIPTION OF THE EMBODIMENTS

Figure 1:
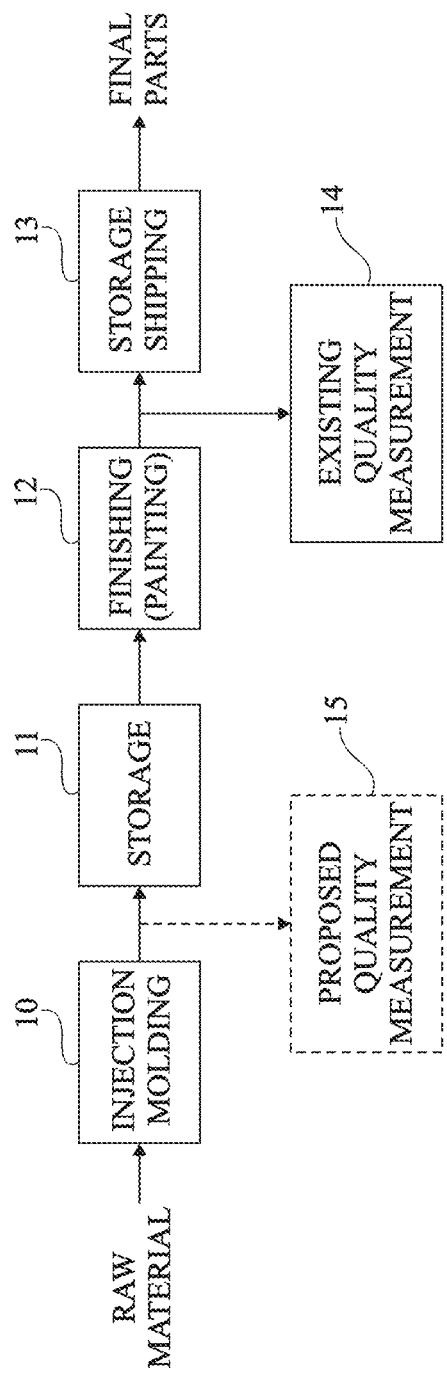
FIG. 1 is a diagram of an example of a production process of the type to which described embodiments and implementation modes apply.

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., unless otherwise specified, it is referred to the orientation of the drawings.

Unless specified otherwise, the expressions "around," "approximately," "substantially" and "in the order of" signify within 10%, and preferably within 5%.

FIG. 1 is a diagram of an example of a production process of the type to which described embodiments and implementation modes apply.

In the example of FIG. 1, it is started by shaping the raw material (RAW MATERIAL) during an injection molding, or plastic injection, phase (block 10, INJECTION MOLDING). The raw material here typically appears in the form of pellets made of thermoformable plastic material, or thermoplastic material.

Generally, during phase 10, the pellets are first conveyed to a plasticizing cylinder due to a mechanism comprising at least one endless screw driven by a hydraulic motor. The plasticizing cylinder enables to heat the pellets above a temperature, noted Tf, from which the thermoplastic material is in a fluid, malleable state.

The previously heated thermoplastic material is then injected under pressure into a mold. According to cases, the mold comprises one or a plurality of cavities, each corresponding to the shape of a part which is desired to be formed. During the injection, the temperature inside of the mold is generally sufficiently low to cause a solidification of the plastic material by cooling. In the case of parts having complex geometries, a mold heating system (for example, by induction) enables to keep the mold at a temperature Tm.

Temperature Tm is then adjusted to avoid, or to delay, the solidification of the thermoplastic material during the injection.

Phase 10 then carries on by a holding step, during which a constant pressure is applied. This enables to keep on feeding with thermoplastic material the cavity or cavities of the mold. The shrinkage of the thermoplastic material during subsequent steps is thus limited.

In the case where the mold is kept at temperature Tm during the injection, the mold is then cooled below temperature Tm to cause a solidification of the thermoplastic material.

Phase 10 ends with the opening of the mold and the ejection of the part(s) which are located therein.

The parts of plastic material obtained at the end of phase 10 are then stored (block 11, STORAGE). During storage phase 11, the parts are for example temporarily stored in boxes while waiting to be submitted to other operations.

In the example of FIG. 1, the parts stored during phase 11 are then painted during a finishing phase (block 12, FINISHING (PAINTING)).

Finally, the parts painted during phase 12 are then stored and then shipped (block 13, STORAGE SHIPPING) and thus form the final parts (FINAL PARTS) intended to be marketed As illustrated in FIG. 1, a quality control (block 14, EXISTING QUALITY MEASUREMENT) is generally performed between phases 12 and 13. Quality control 14 thus bears on the parts obtained at the end of finishing phase 12, in other words on the painted parts. Quality control 14 is usually performed by sampling, in other words quality control 14 often only concerns a small portion, typically less than 10%, of the parts resulting from phase 12.

According to the described embodiments, a first quality control (block 15, PROPOSED QUALITY MEASUREMENT) preceding quality control 14 is performed, that is, quality control 15 is performed upstream of quality control 14. As illustrated in FIG. 1, quality control 15 is preferably implemented from as soon as the end of injection molding phase 10, that is, before phases 11, 12, and 13. Quality control 15 is preferably performed as a complement to quality control 14.

An advantage of quality control 15 lies in the fact that it enables to detect possible non-compliant parts before performing storage phase 11 and finishing or painting phase 12. Non-compliant parts can thus be discarded or removed from as soon as the end of phase 10. Generally, the carrying out of phase 12 is much more expensive, often at least ten times more expensive, than the carrying out of phase 10. Quality control 15 accordingly enables to decrease the risk for expensive manufacturing phases to be uselessly carried out on non-compliant parts resulting from a previous phase, but which have not been identified as such yet, which non-compliant parts can generally not be commercialized afterwards. This may represent a significant financial gain, in particular for the manufacturer in charge of the part manufacturing.

Further, it can often be observed that most non-compliances appear during the forming phase, that is, during phase 10 in this example. Another advantage of quality control 15 thus lies in the fact that it enables to detect the most part of the non-compliances likely to affect the parts.

Still another advantage of quality control 15 lies in the fact that it is implemented on all the produced parts. The risk for non-compliant parts to escape the quality control and to be marketed is thus decreased. In the case where the non-compliant parts are defective, for example when they are likely to cause a malfunction of the devices to which they belong, the addition of quality control 15 is an additional security for the final users of the devices.

It may be believed that the addition of quality control 15 would complicate the part production process. This is however not the case, since the fact of performing quality control 15 upstream of quality control 14 advantageously enables to simplify quality control 14. Quality control 15 may for example bear on geometric and dimensional characteristics of the parts, quality control 14 then only concerning the painting of the parts.

Figure 2:
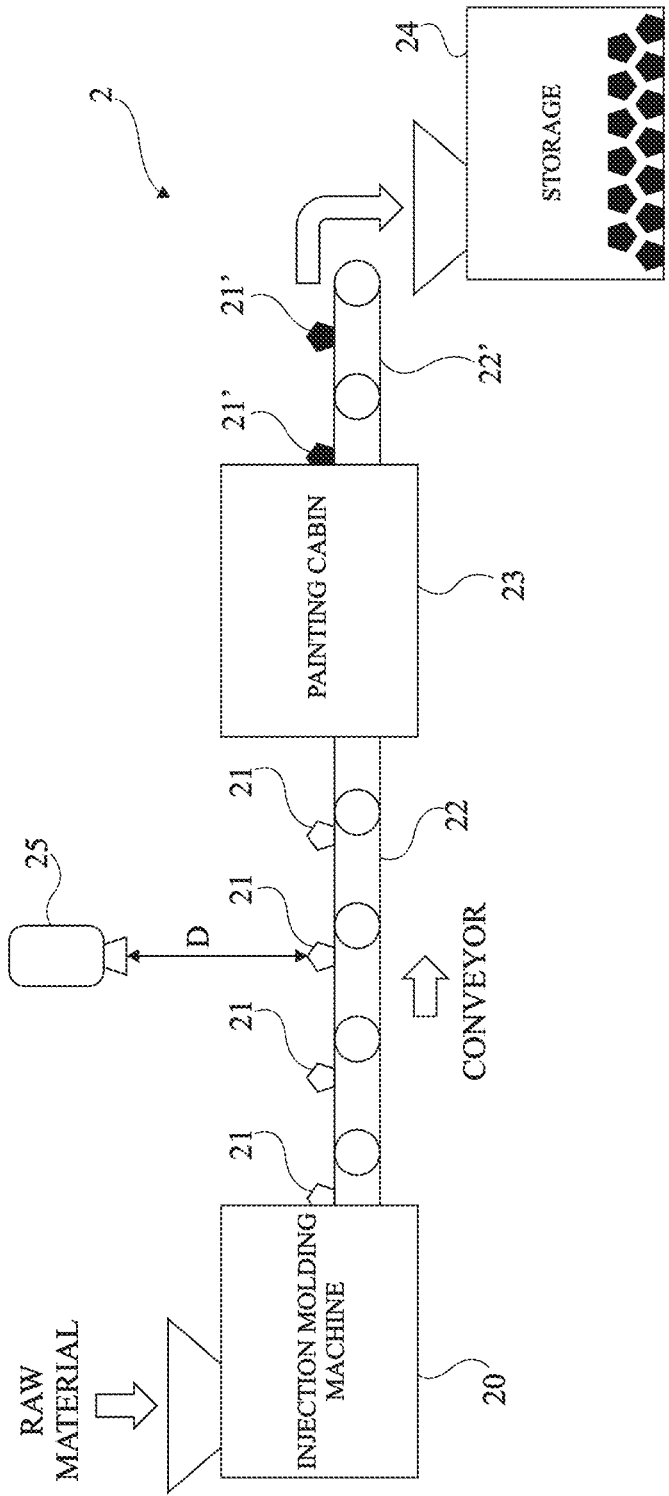
FIG. 2 schematically shows an embodiment of a production line.

FIG. 2 schematically shows an embodiment of a production line 2.

According to this embodiment, a plastic injection machine 20 (INJECTION MOLDING MACHINE), or injection molding machine, is fed with raw material (RAW MATERIAL). One obtains, at the outfeed of plastic injection machine 20, parts 21 based on one or a plurality of thermoplastic materials, according to the raw material used. In FIG. 2, parts 21 are symbolized by pentagons, it being understood that, in practice, parts 21 may have any shape.

Parts 21 are conveyed, by a conveyor 22 (CONVEYOR), for example, a belt conveyor, all the way to a painting cabin 23 (PAINTING CABIN). Parts 21, originating from plastic injection machine 20, are painted inside of painting cabin 23. As they come out of painting cabin 23, the painted parts 21' are conveyed, by another conveyor 22' (as a variant, by the same conveyor), all the way to a storage place 24 (STORAGE).

In FIG. 2, production line 2 comprises a device 25 adapted to implementing the quality control 15 such as discussed in relation with FIG. 1. Device 25 is placed at the outfeed of plastic injection machine 20, that is, before any other manufacturing step, in particular before painting cabin 23. Device 25 is placed vertically in line with parts 21 conveyed by conveyor 22. Device 25 is more precisely located at a distance, noted D, from parts 21 which transit vertically in line with device 25. Distance D is adjusted according to dimensional, geometric, etc. characteristics of the parts to be controlled. Distance D is preferably in the range from approximately 20 cm to approximately 2 m.

The shaping of a part 21 by means of injection machine 20 takes from approximately 10 seconds to approximately 30 seconds. According to a preferred embodiment, conveyor 22 is stopped for a duration shorter than the duration of the shaping of a part 21, for example, for less than 5 seconds, each time a part 21 is substantially vertically in line with quality control device 25. This enables device 25 to perform in line, that is, during the manufacturing, a quality control on all the parts 21 of line 2 without for all this penalizing the production rate of line 2.

It could have been devised to integrate one or a plurality of sensors directly in a mold of plastic injection machine 20 from which parts 21 originate. Such sensors, called invasive, would however have been submitted to highly constraining ambient conditions, particularly temperature and pressure. This would in particular have strongly limited the sensor lifetime. The sensors would further have been very uneasily accessible, which would have complicated their maintenance.

It could also have been devised to use a feeler-type quality control device, placed in contact with each part 21 produced by line 2. Such a device would however have required a significant displacement time and positioning time, which would have resulted in a decrease in the production rate of line 2. It is further difficult to control the geometry of a part made of plastic material by the implementation of a contact technique, due to the fact that plastic parts generally have an elasticity which tends to alter the control.

An advantage of device 25 lies in the fact that device 25 is non-invasive. This particularly enables device 25 to be independent from plastic injection machine 20 and to be exposed to lightly constraining ambient conditions. The integration of device 25 on an existing production line is thus greatly facilitated. Device 25 may further be installed to facilitate its accessibility, which simplifies the maintenance.

Figure 3:
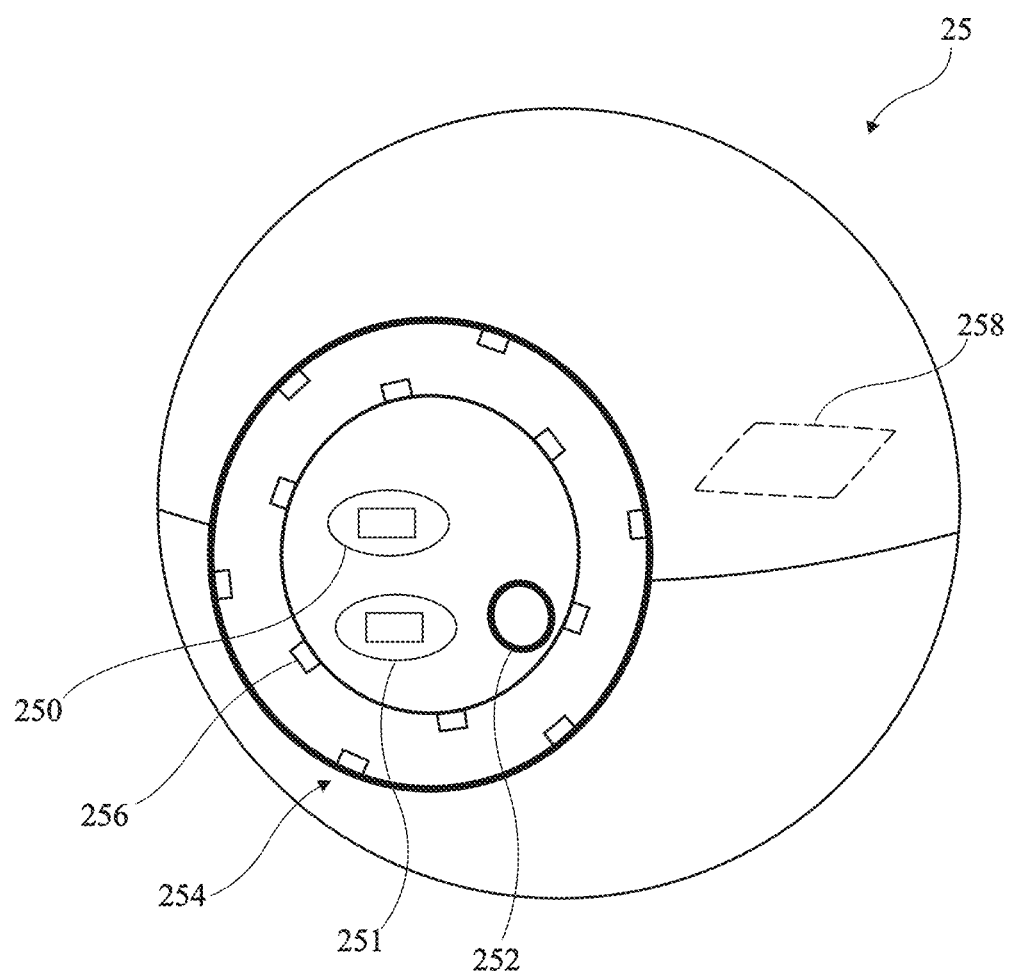
FIG. 3 schematically shows an embodiment of a quality control device.

FIG. 3 schematically shows an embodiment of a quality control device 25.

According to this embodiment, device 25 particularly comprises:
- a first image sensor 250;
- a second image sensor 251;
- a detector 252 of the presence of a part, or part presence sensor, located close to image sensors 250, 251; and
- a lighting device 254, arranged at the periphery of image sensors 250, 251 and of presence detector 252. Lighting device 254, configured to illuminate the part, is for example formed of a succession of light-emitting diodes 256 forming a ring at the periphery of sensors 250, 251 and of detector 252.

In the shown example, device 25 further comprises a control circuit 258. Control circuit 258 is for example coupled to image sensors 250 and 251. Control circuit 258 is for example adapted to controlling the acquisition of images by each image sensor 250, 251. More particularly, control circuit 258 is for example adapted to simultaneously controlling the acquisition, for each part to be controlled, of a first image by first image sensor 250 and of a second image by second image sensor 251.

According to a preferred embodiment, image sensors 250 and 251 are configured to form image types different from visible images capable of being obtained due to a "conventional" image sensor. According to this preferred embodiment, image sensor 250 is, in particular, configured to form images by polarimetry, or polarized light images, while second image sensor 251 is configured to form images by thermography, or thermal images.

As a variant, device 25 comprises a single image sensor combining the functionalities of first sensor 250 and of second sensor 251.

Each sensor 250, 251 is preferably associated with a viewing hole. As a variant, the two sensors 250 and 251 share a same viewing hole, one or a plurality of mirrors then enabling to reflect the image onto each of the two sensors 250, 251. First sensor 250 preferably has an optical system different from that of second sensor 251, the two sensors operating in different wavelength ranges.

The polarized images are obtained by reflection, on the part, of incident light emitted by ring-shaped lighting device 254. The polarized images provide information relative to a surface state of the part to be controlled. The incident light is thus preferably non-polarized.

As a variant, the incident light emitted by lighting device 254 is polarized, for example, according to the material forming the part to be controlled. According to this variant, a linear or circular polarization filter (not shown) is positioned before lighting device 254 according to an orientation adapted to the material to be imaged.

Lighting device 254 is preferably on when a part is detected by presence detector 252. Lighting device 254 is preferably off when detector 252 detects no part. This particularly enables to save power and/or to increase the lifetime of the components of lighting device 254.

The thermal images are obtained by capturing an infrared image of the part to be controlled when this part is still hot, for example at the outfeed of plastic injection machine 20 (FIG. 2). The thermal images provide information relative to the geometry of the part to be controlled.

Lighting device 254 is preferably formed of a plurality of light-emitting diodes 256 intended to illuminate a part or an object, for example, one of parts 21 (FIG. 2), on which a quality control is desired to be performed.

Device 25 is, according to this embodiment, of substantially spherical shape. Device 25 then has an outer diameter of approximately 20 cm.

An advantage of device 25 lies in the fact that it enables to couple a polarized light image analysis and a thermal image analysis. This particularly enables to obtain a detection level equivalent to that which would be provided by a thermographic or polarimetric sensor alone (for example, first sensor 250 alone or second sensor 251 alone) having a resolution greater than that of sensor 250 and/or of sensor 251.

Another advantage of the embodiment of the device 25 discussed in relation with FIG. 3 lies in the fact that device 25 has compact dimensions, which particularly enable it to be easily installed on a production line, for example, line 2 (FIG. 2).

Device 25 further embeds a processing system, for example, a computer (not shown in FIG. 3), intended to process the polarized images and the thermal images respectively acquired by image sensors 250 and 251. The computer of device 25 is preferably a passive cooling computer, in other words, a fanless computer.

Figure 4:
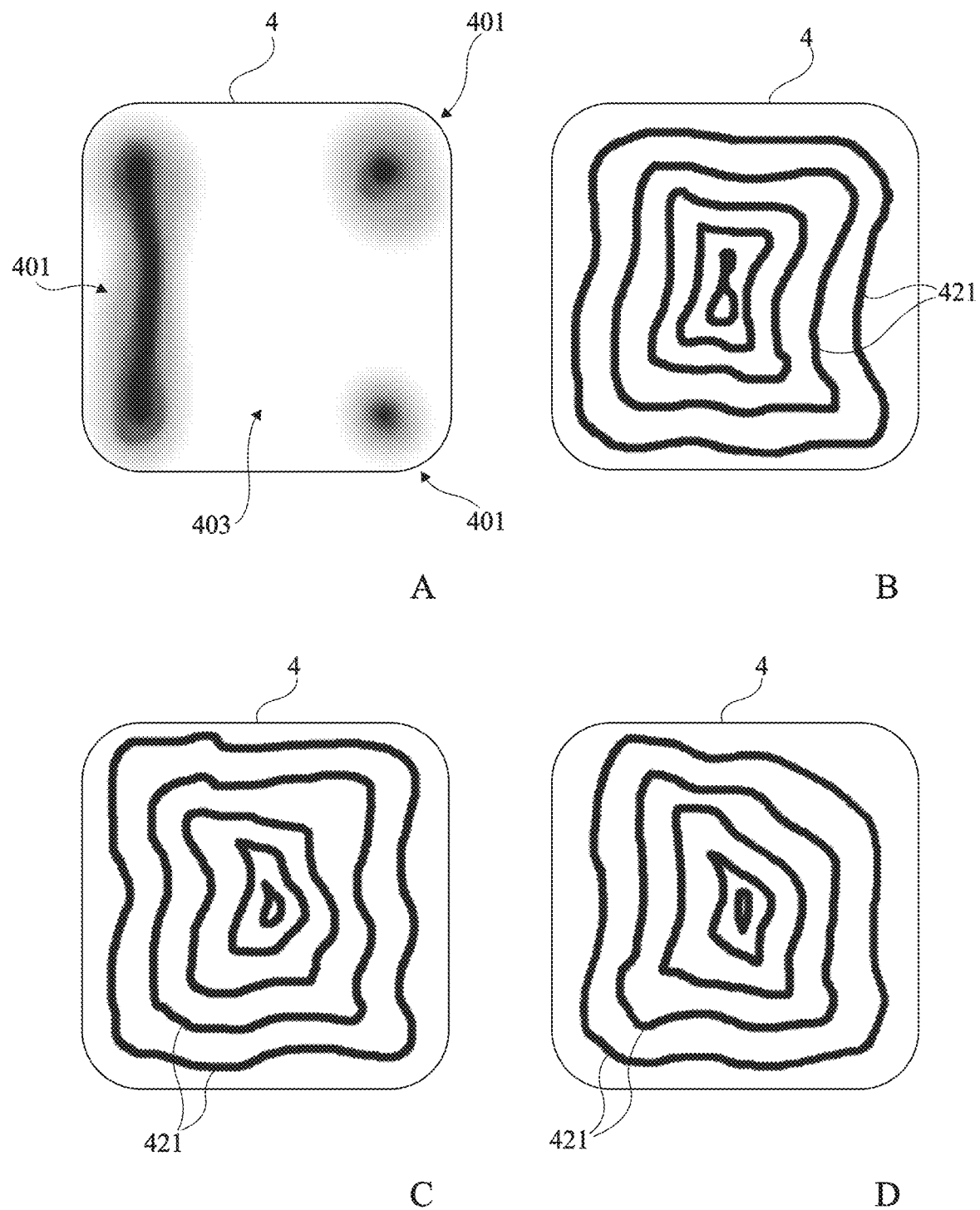
FIG. 4 shows, in views A, B, C, and D, examples of images obtained from the device of FIG. 3.

FIG. 4 schematically shows in views A, B, C, and D, examples of images obtained from the device 25 of FIG. 3.

View A more precisely shows a thermal image of a part 4, for example, a vessel of substantially square shape and comprising rounded corners. This thermal image is captured by device 25 at the outfeed of plastic injection machine 20 (FIG. 2). Device 25 is placed close to plastic injection machine 20, so that part 4 is still hot during the acquisition of thermal image.

The thermal image enables to highlight temperature differences between areas of part 4. In the example of view A, dark regions 401 located approximately in the corners of part 4 correspond to areas of part 4 where the temperature is lower than in a lighter region 403 located approximately at the center of part 4.

The thermal image may be, as illustrated in view A, a greyscale image where a contrast between different regions is interpreted as a temperature difference between these regions. The thermal image may alternately be a color image, where a color code is associated with a temperature range where the different regions of part 4 are likely to be present.

The inventors have observed that the thermal images, such as that illustrated in view A, enable to provide the final geometry of the part after cooling. In the case of parts having a significant thickness, for example in the order of several centimeters, the cooling may last for up to one day. An advantage of device 25 is to enable to detect possible defective parts from as soon as their coming out of the plastic injection machine, without having to wait for their complete cooling. These parts may thus be discarded at the soonest from the production line.

Views B, C, and D respectively show images by polarimetry of part 4 obtained for different polarization angles, for example, 0°, 45°, and 90°. These images exhibit an iridescence symbolized, in views B, C, and D, by concentric rings 421. The shape of rings 421, which varies according to the polarization angle, provides indications relative to the surface state of part 4.

Figure 5:
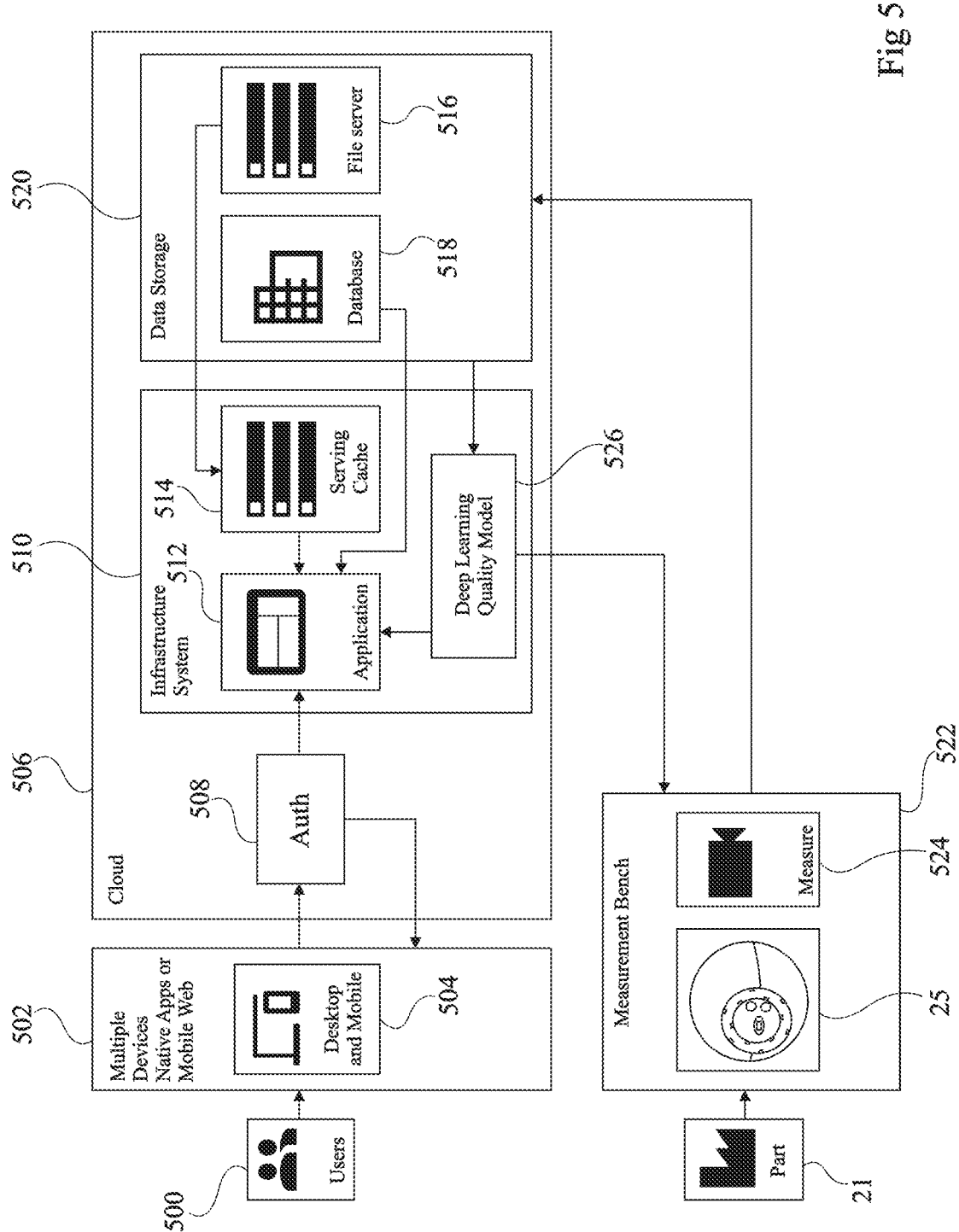
FIG. 5 shows a diagram of an implementation mode of the device of FIG. 3.

FIG. 5 shows a diagram of an implementation mode of the device of FIG. 3.

According to this implementation mode, hardware interfaces or drive terminals (block 502, Multiple Devices Native Apps or Mobile Web), for example, desktop computers and/or mobile phones (block 504, Desktop and Mobile) are made available to at least one operator (block 500, Users). Hardware driver interfaces 502 enable operator 500 to connect to a computer platform in the cloud (506, Cloud). The connection is, in the example of FIG. 5, submitted to an authentication process (block 508, Auth).

Platform 506 hosts a software infrastructure (bloc 510, Infrastructure System) particularly comprising an application (bloc 512, Application) dedicated to the processing of the images acquired by device 25. In the example of FIG. 5, application 512 processes data originating from a buffer memory (block 514, Serving Cache), powered by a data server (block 516, File server), and data originating from a database (block 518, Database). However, in this example, database 518 and data server 516 form part of a data storage entity (block 520, Data Storage).

The data stored in entity 520 originate from a measurement bench (block 522, Measurement Bench) comprising device 25. Measurement bench 522 may also comprise other measurement systems shown, in FIG. 5, by a single block 524 (Measure).

According to this implementation mode, interface 502 communicates in real time with infrastructure 510, comprising database 518. For each new part 21, measurement bench 522 updates database 518 by recording therein the polarimetry and thermography images captured by device 25.

The data contained in database 518 are, for each part 21, estimated from a quality model (block 526, Deep Learning Quality Model). Quality model 526 enables to assign a score to each part 21, according to one or a plurality of polarimetry images and of one or a plurality of thermography images of the considered part 21. The calculation of this score is, during the manufacturing of parts 21, adapted (modified) by a learning process. The learning process is preferably a machine learning process (machine learning), for example, a deep learning process (deep learning) implemented by a neural network.

In practice, operator 500 starts by establishing quality model 526 from a batch comprising, for example, some hundred parts 21. According to a preferred embodiment, it is ascertained that the batch is formed of approximately 50% of parts 21 capable of being considered as complying with specifications and approximately 50% of parts 21 non-compliant to these specifications. Via application 512, operator 500 then indicates, for each part 21 in the batch, whether the considered part 21 is compliant or non-compliant. Further, operation 500 assigns a score to each part 21 and enters this score into application 512. The initial quality model 526 is thus established.

Once the score has been entered for each part 21 in the batch, new parts 21 are analyzed by application 512. A score is then assigned to these new parts 21 from the initial quality model 526. Operator 500 may improve quality model 526 as parts 21 are being produced. At any time, operator 500 may also complete quality model 526 by validating a score provided by application 512 or by modifying the score provided by application 512, for example, in case of an estimation error with respect to quality model 526.

The score assignment preferably takes less than 10 seconds. This thus enables operator 500 to follow, almost in real time, the quality of the produced parts 21.

According to an implementation mode, a feedback loop enables to modify operating parameters of plastic injection machine 20 (FIG. 2) according to the scores assigned by application 512. This enables to correct at the soonest possible drifts of plastic injection machine 20.

Figure 6:
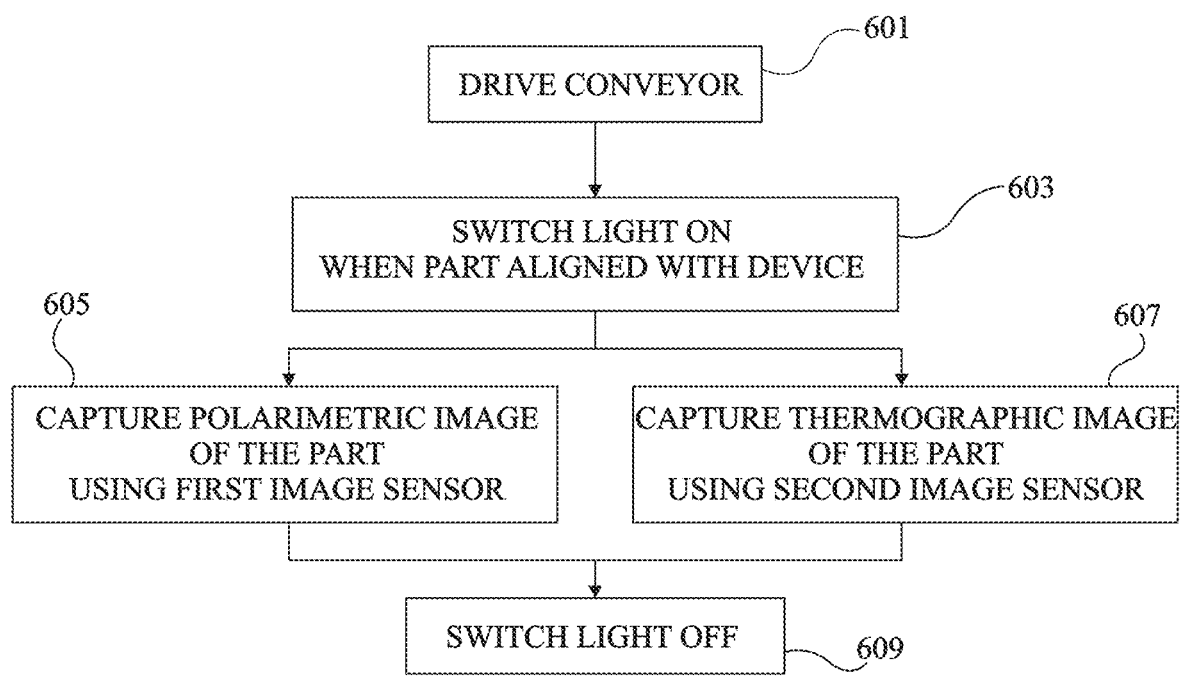
FIG. 6 is a diagram illustrating an implementation mode of a part control method.

FIG. 6 is a diagram illustrating an implementation mode of a part control method. In the shown example, the method is applied to the control of one of the parts 21 of the production line 2 previously discussed in relation with FIG. 2.

At a step 601 (DRIVE CONVEYOR), conveyor 22 (FIG. 2) is for example started to take the part 21 to be controlled under device 25.

At another step 603 (SWITCH LIGHT ON WHEN PART ALIGNED WITH DEVICE), lighting device 254 is turned on to illuminate the part 21 to be controlled.

At another step 605 (CAPTURE POLARIMETRIC IMAGE OF THE PART USING FIRST IMAGE SENSOR), first image sensor 250 forms a polarimetric image of the part 21 to be controlled. Similarly, at another step 607 (CAPTURE THERMOGRAPHIC IMAGE OF THE PART USING SECOND IMAGE SENSOR), second image sensor 251 forms a thermographic image of the part 21 to be controlled. In the shown example, steps 605 and 607 are simultaneous.

During steps 605 and 607, control circuit 258 for example transmits an image capture control signal to each image sensor 250, 251. The image capture control signals are for example simultaneously transmitted by control circuit 258. However, the image capture control signals may reach image sensors 250 and 251 with a slight time delay with respect to each other. In other words, one of the control signals may be received by one of sensors 250, 251 before the other control signal is received by the other sensor 251, 250. Such a time delay is for example linked to a difference in electric capacitance between lines of transmission of the image capture control signals. Further, the image capture control signal may be executed by image sensor 250 after a processing delay slightly different from that of image sensor 251. As a result, although the image capture control signals are simultaneously transmitted by control signal 258, sensors 250 and 251 may however form the polarimetric and thermographic images with a slight time delay with respect to each other.

During steps 605 and 607, it may be desirable to immobilize the part 21 to be controlled at the time of the simultaneous capture of the polarimetric and thermographic images. In this case, conveyor 22 is for example stopped when the part 21 to be controlled is substantially aligned with respect to the optical axes of the image sensors 250 and 251 of device 25. As a variant, the polarimetric and thermographic images are formed while the part 21 to be controlled is being displaced by conveyor 22. In this case, the displacement of the part 21 to be controlled may be slowed down at the time of the image capture to ease the image capture.

Step 603 of turning on of lighting device 254 and steps 605 and 607 of forming of the polarimetric and thermographic images are for example separated by a duration enabling to stabilize the lighting. It may for example be awaited for lighting device 254 to reach a sufficiently stable light intensity to avoid disturbing the image captures. As an example, the duration of stabilization of the lighting is in the order of from a few tenths of seconds to a few seconds.

At another step 609 (SWITCH LIGHT OFF), lighting device 254 is turned off. An advantage due to the turning off of lighting device 254 after each control of a part 21 is that this enables to lengthen the lifetime of device 25, for example, in the case illustrated in FIG. 3 where lighting device 254 is based on light-emitting diodes 256. This further enables to save power.

Various embodiments and variants have been described. It will be understood by those skilled in the art that certain features of these various embodiments and variations may be combined and other variations will occur to those skilled in the art.

Finally, the practical implementation of the described embodiments and variations is within the abilities of those skilled in the art based on the functional indications given hereabove.

The invention claimed is:

1. A device for controlling parts being manufactured, comprising:
   exactly two image sensors, wherein:
      a first image sensor being configured to form a first image for each part by thermography;
      a second image sensor being configured to form a second image for each part by polarimetry; and
   a control circuit adapted to simultaneously controlling the forming of the first and second images.

2. A device according to claim 1, wherein a score is assigned, to each part, according to the first and second images.

3. A device or method according to claim 2, wherein a calculation of the score is, during the manufacturing of the parts, adapted by a learning process.

4. A device according to claim 1, wherein a presence detector is configured to detect the presence of a part.

5. A device according to claim 1, wherein the parts (21; 4) comprise one or a plurality of thermoplastic materials.

6. A device according to claim 1, wherein the parts are manufactured by injection into a mold.

7. A device according to claim 1, wherein the device comprises a lighting device configured to illuminate the part.

8. A method of controlling parts being manufactured, implementing at least one device according to claim 1.

9. A method according to claim 8 comprising, for each part to be controlled, the successive steps of:
   a) turning on a lighting device comprised in said device;
   b) forming the polarimetric image and the thermographic image; and
   c) turning off the lighting device.

10. A method according to claim 9, wherein steps a) and b) are separated by a duration for which the lighting device is stabilized.

11. A system comprising:
   a part manufacturing line; and
   a device according to claim 1.

12. A system according to claim 11, wherein the device is located at the outfeed of a plastic injection machine.

* * * * *